(12) United States Patent
Carlhammar et al.

(10) Patent No.: US 8,688,350 B2
(45) Date of Patent: Apr. 1, 2014

(54) HYBRID POWERTRAIN AND METHOD FOR CONTROLLING A HYBRID POWERTRAIN

(71) Applicant: Volvo Technology Corp., Göteborg (SE)

(72) Inventors: Lars Carlhammar, Lindome (SE);
Svante Karlsson, Västra Frölunda (SE);
Helene Panagopoulos, Göteborg (SE)

(73) Assignee: Volvo Technology Corporation, Göteborg (SE)

(*) Notice: Subject to any disclaimer, the term of this patent is extended or adjusted under 35 U.S.C. 154(b) by 0 days.

(21) Appl. No.: 13/847,848

(22) Filed: Mar. 20, 2013

(65) Prior Publication Data

US 2013/0231813 A1  Sep. 5, 2013

Related U.S. Application Data

(60) Division of application No. 12/281,088, filed as application No. PCT/SE2007/000229 on Mar. 9, 2007, which is a continuation-in-part of application No. PCT/SE2006/000314, filed on Mar. 9, 2006.

(51) Int. Cl.
*G06F 19/00* (2011.01)
*G06G 7/70* (2006.01)

(52) U.S. Cl.
USPC .......... 701/101; 701/36; 701/54; 701/99; 701/111; 701/113; 180/65.21; 180/65.265; 180/65.275; 180/65.28; 903/902; 903/905

(58) Field of Classification Search
USPC .............. 701/22, 36, 99, 101, 102, 103, 104, 701/110, 111, 113; 180/65.1, 65.21, 65.22, 180/65.245, 65.265, 65.275, 65.28, 65.285, 180/65.31; 903/902, 905, 906, 930, 945, 903/946; 290/40 R, 41, 40 A–40 F; 477/2, 3, 477/5, 6, 7, 8
See application file for complete search history.

(56) References Cited

U.S. PATENT DOCUMENTS

| | | | |
|---|---|---|---|
| 5,755,302 A * | 5/1998 | Lutz et al. ................. | 180/65.21 |
| 6,376,927 B1 * | 4/2002 | Tamai et al. ................ | 290/40 C |
| 6,380,641 B2 * | 4/2002 | Matsubara et al. ......... | 290/40 C |
| 7,766,107 B2 * | 8/2010 | Joe et al. .................... | 180/65.21 |
| 2001/0022245 A1 * | 9/2001 | Rogg ........................... | 180/65.2 |
| 2002/0170758 A1 * | 11/2002 | Shimabukuro et al. ...... | 180/65.2 |
| 2004/0142790 A1 * | 7/2004 | Tomura et al. .................... | 477/2 |
| 2005/0054480 A1 * | 3/2005 | Ortmann et al. .................... | 477/6 |
| 2005/0097541 A1 * | 5/2005 | Holland ........................ | 717/168 |
| 2007/0270277 A1 * | 11/2007 | Ortmann et al. .................... | 477/5 |
| 2010/0106394 A1 * | 4/2010 | Seufert et al. ................. | 701/113 |
| 2011/0125353 A1 * | 5/2011 | Komeda et al. ................. | 701/22 |

* cited by examiner

*Primary Examiner* — Rami Khatib
(74) *Attorney, Agent, or Firm* — WRB-IP LLP

(57) ABSTRACT

A hybrid powertrain includes a combustion engine, an electric machine arrangement, a gearbox operable to receive motive power from at least one of the combustion engine and the electric machine arrangement for providing motive power to a load of the powertrain. The powertrain is configurable in operation so that its combustion engine is switchable between an inactive state and an active state. The combustion engine is cranked to switch it from its inactive state to its active state. Application of cranking torque to the combustion engine is controlled in operation to substantially temporally coincide with a gear change in the gearbox.

21 Claims, 8 Drawing Sheets

HYBRID POWERTRAIN AND METHOD FOR CONTROLLING A HYBRID POWERTRAIN

The present application is a divisional of U.S. application Ser. No. 12/281,088, filed Aug. 28, 2012, which is the U.S. National Stage of PCT/SE2007/000229, filed Mar. 9, 2007, which claims benefit of PCT/SE2007/000314, filed Mar. 9, 2006, all of which are incorporated by reference.

BACKGROUND AND SUMMARY

The present invention relates to hybrid powertrains, for example for automobiles, passenger vehicles, buses, trucks, boats and stationary applications. Moreover, the invention also concerns methods of controlling such powertrains, for example with regard to combustion engine cranking and gear change. Furthermore, the present invention also relates to vehicles, boats and similar including such powertrains. Additionally, the present invention relates to software executable on computing hardware for executing the methods of controlling such powertrains.

In recent years, considerable research has been invested in hybrid system technology in order to provide enhanced fuel economy as well as improved motive performance. Hybrid systems include hybrid powertrains, wherein each powertrain usually comprises a combustion engine, an electric machine arrangement, an electrical storage element, a control unit for managing the powertrain, and a transmission arrangement for coupling at least the electric machine to a load of the system. The electric machine is optionally implemented as a motor/generator. Superficially, such hybrid powertrains would seem to involve additional complexity and potentially added weight which would be deleterious to system performance. However, in practice, several benefits arise from employing hybrid powertrains in comparison to conventional simple combustion engine systems which operate sub-optimally, especially in urban stop-start scenarios.

In contemporary hybrid powertrains, enhanced energy economy can be obtained by operating a combustion engine at its most thermally efficient range and periodically stopping and starting the combustion engine. When the combustion engine is not in operation, motive power is provided by one or more electric motors coupled to a rechargeable battery via electronic control circuits. When the combustion engine is in operation, the combustion engine can be recharging the rechargeable battery and/or providing motive power. Moreover, in some designs of hybrid powertrain, the one or more electric motors can be configured to function as generators for providing regenerative braking wherein kinetic energy is converted at braking to recharge rechargeable batteries.

A technical problem encountered in practice is that drivers of contemporary simpler combustion engine vehicles are accustomed to refined performance wherein their vehicles perform quietly without greatly perceptible vibration from their engines. In contradistinction, hybrid vehicles designed so that their combustion engines intermittently are activated and deactivated can be prone to additional vibration and abrupt changes in available motive torque which drivers experience as disconcerting and potentially dangerous when attempting critical maneuvers, for example overtaking another vehicle.

This technical problem has been previously appreciated and is addressed in a hybrid powertrain described in a published U.S. Pat. No. 4,533,011. In overview, there is described a powertrain as illustrated in FIG. 1. The powertrain is indicated generally by 10 and comprises an internal combustion engine 20 including an exhaust manifold 30. The combustion engine 20 is coupled to a fuel supply controlling device 40 configured to be supplied with fuel from a fuel tank 50. An output crank shaft of the combustion engine 20 is coupled via a first disconnecting clutch 60 to an electric machine 70 operable to function both as an electric motor and an electric generator. The electric machine 70 is further coupled via a second disconnecting clutch 80 to an input of a gear transmission 90; the transmission 90 is operable to provide geared transmission whose gearing ratio is controlled via a gear control unit 100. An output of the transmission 90 is connected via a differential gear 110 to wheels 120 of a vehicle accommodating the powertrain 10.

The powertrain 10 in FIG. 1 further includes a rechargeable battery 200 coupled via an electronic control unit 210 to the electric machine 70; the electronic control unit 210 is operable to control electrical power supplied to the electric machine 70 to generate torque therein, and to control electric energy generated within the electric machine 70 which is coupled to the rechargeable battery 200 for recharging the battery 200. The powertrain 10 further comprises an engine management control unit 220 which is coupled in communication with the disconnection clutches 60, 80, with the electronic control unit 210 and with the fuel supply controlling device 40.

Operation of the powertrain 10 will now be described in overview. The electric machine 70 is designed to function as a flywheel for the combustion engine 20 so that the combustion engine 20 is less massive and has less rotational inertia associated therewith when decoupled by the first clutch 60 from the electric machine 70. When the second clutch 80 is decoupled and the first clutch 60 is coupled, the electric machine 70 is operable to crank the combustion engine 20 to start the combustion engine 20 into operation by supplying fuel thereto via the supply controlling device 40. When the combustion engine 20 is activated and operational, the second clutch 80 is then engaged to couple motive power generated by the combustion engine 20 and optionally the electric machine 70 via the transmission 90 to the one or more wheels 120 to propel the powertrain 10 and its associated vehicle. When the combustion engine 20 is subsequently to be deactivated, the first clutch 60 is disengaged and the fuel supply controlling device 40 then interrupts supply of fuel to the engine 20. On account of the combustion engine being isolated by way of the first clutch 60 being disengaged, minimal vibration and substantially no sudden changes in available torque are experienced by a driver of the vehicle accommodating the powertrain 10.

When driving away from a stationary state, the first clutch 60 is substantially disengaged and the electric machine 70 is employed for generating an initial substantial starting torque so as to provide a smooth and rapid acceleration of the vehicle. When the vehicle has attained a threshold speed, the first clutch 60 is then engaged so that torque provided by the combustion engine 20 can be used to supplement that provided from the electric machine 70. When the combustion engine 20 is deactivated, torque for propelling the vehicle is provided solely by the electric machine 70.

Although the powertrain 10 illustrated in FIG. 1 provides many technical advantages in operation, it nevertheless represents a complex configuration with the two clutches 60, 80. Moreover, even though the combustion engine 20 relies on the electric machine 70 to function as a flywheel, the combustion engine 20 when still rotating and decoupled from the electric machine 70 is potentially prone to unstable operation before coming to a rotational standstill on interruption of its fuel supply.

Thus, the powertrain 10 does not represent an optimal powertrain configuration and is susceptible to being further improved to simplify its implementation and provide yet further improved vibration and smooth torque generation characteristics.

In a published U.S. Pat. No. 5,755,302, there is described a drive apparatus for a hybrid vehicle. The drive apparatus includes an internal combustion engine and a gear-shifting transmission unit. Moreover, the drive apparatus includes a rotatable crank shaft operatively connectable to the internal combustion engine, and a rotatable transmission shaft operatively connectable to the gear-shifting transmission unit. Furthermore, the drive apparatus further comprises a movable annular rotor disposed annularly about the transmission shaft, the rotor including a permanent magnet for generating a magnetic field and an attachment mechanism for attaching the rotor to the transmission shaft so that torque is transmitted in operation between the rotor and the transmission shaft. A stationary annular stator is attachable to at least one of the internal combustion engine and the gear-shifting transmission unit and is disposed concentrically about and proximate the rotor in an electromagnetically interactive relation. The stator includes a conductive winding for electromagnetically interacting with the magnetic field of the rotor.

Additionally, the drive apparatus includes only one clutch disposed at least partially within a recess of the stator, the clutch including two coupling mechanisms for selectively and frictionally coupling the crank shaft to the transmission shaft for torque transmission therebetween so that the clutch is switchable between: (a) an engaged position in which torque is transmitted between the crankshaft and the transmission shaft; and (b) a disengaged position in which the torque transmission between the crankshaft and the transmission shaft can be discontinued. An electronic control unit of the drive apparatus is operable to vary an electric load or torque generated by an electric machine comprising the aforesaid rotor and stator in a timely manner such that torque fluctuations at the transmission shaft are reduced by way of torsional vibration damping. In so doing, frictional engagement can be achieved sufficiently smoothly so that engagement of the clutch is free of jolts and induces minimal wear. The transmission is braked electrically by the electric machine in order to shift up a gear, and is accelerated electrically to shift down a gear. However, such synchronization for gear change takes time to implement in operation.

It is desirable to provide an improved hybrid powertrain.

According to a first aspect of the invention, there is provided a hybrid powertrain including:

a combustion engine;

an electric machine arrangement;

a gearbox operable to receive motive power from at least one of the combustion engine and the electric machine arrangement for providing corresponding motive power to a load;

a control unit coupled in communication with the combustion engine, the electric machine arrangement and the gearbox for controlling their operation;

wherein the powertrain is configurable in operation so that its combustion engine is switchable between an inactive state and an active state, the combustion engine requiring to be cranked to switch it from its inactive state to its active state, characterized in that the control unit includes multiple-inputs for receiving feedback signals derived from the powertrain and command signals to the powertrain, and multiple-outputs for outputting output signals for controlling operation of the powertrain; and the control unit further includes computing hardware operable to execute a torque simulation of the powertrain, the simulation being applicable in operation to process information provided at the multiple-inputs to compute a compensation, the control unit being operable to apply the compensation at the multiple outputs to reduce an amplitude of torque jerks occurring in operation in the powertrain when the engine is switched between its active and inactive states.

The invention is of advantage in that powertrain is capable of providing improved performance with regard to reduced sudden torque variations, namely "jerks", as well as with regard to simplicity and ease of operation.

Optionally, in the hybrid powertrain, application of cranking torque to the combustion engine is controlled in operation by the control unit to substantially temporally coincide with a gear change in the gearbox.

Beneficially, in the powertrain, wherein, whilst the gearbox is in a neutral coupling state, the combustion engine is operable to be cranked by decelerating the electric machine arrangement to substantially a standstill, at least partially rotationally coupling via a rotational coupling arrangement the combustion engine to the electric machine arrangement applying excitation to the electric machine arrangement to rotationally accelerate it and thereby accelerating the combustion engine to a threshold rotation rate, and then applying a fuel supply to the combustion engine to bring the combustion engine to an active state. Such an approach is capable of reducing wear of the coupling arrangement and is also potentially highly energy efficient with regard to recovering energy to recharge the energy storage element before commencing cranking of the combustion engine.

Optionally, in the powertrain, wherein, whilst the gearbox is in a neutral coupling state, the combustion engine is operable to be cranked by maintaining the electric machine arrangement in a rotating state, at least partially coupling via a rotational coupling arrangement the combustion engine to the electric machine arrangement to transfer torque therefrom to the combustion engine, thereby accelerating the combustion engine to a threshold rotation rate, and then applying a fuel supply to the combustion engine to bring the combustion engine to an active state. Such an approach is potentially more rapid than decelerating the electric motor to substantially a standstill, but potentially may cause more wear of the rotational coupling arrangement.

Preferably, in the powertrain, the rotational coupling arrangement includes a slipping clutch operable to provide a constant-torque coupling characteristic through at least part of its slippage range. Such a constant-torque characteristic is effective at filtering sudden torque variations, namely "jerks".

Preferably, in the powertrain, the electric machine arrangement is coupled via a series arrangement of the clutch and a rotationally-compliant torque coupling to the combustion engine.

Preferably, in the powertrain, the rotational coupling arrangement includes a clutch couplable between the combustion engine and the electric machine arrangement. Such a configuration is found in practice to be compact, simple and robust.

Preferably, in the powertrain, one or more rotational shafts of the combustion engine and the electric machine arrangement are provided with one or more sensors coupled to the control unit for determining a measure of torque coupled to the combustion engine when cranking the combustion engine and causing it to be activated, such measure of torque being processed by the control unit for providing control of the electric machine arrangement for at least partially compensating any abrupt changes in torque occurring in the powertrain. Use of the measure of torque is capable of enabling the control arrangement to more finely control the powertrain to avoid occurrence of "jerks" therein when activating the combustion engine.

Preferably, in the powertrain, the one or more sensors are implemented as rotation rate sensors for measuring rotation rate of their one or more shafts, the measure of torque being computed by the control arrangement from inertial moments of components parts of the powertrain and from angular acceleration temporally computed from the one or more measured rotation rates.

According to a second aspect of the invention, there is provided a hybrid powertrain including:

a combustion engine;

an electric machine arrangement;

a gearbox operable to receive rotational power from at least one of the combustion engine and the electric machine arrangement, the gearbox being operable to provide motive power to a load;

a control unit coupled in communication with the combustion engine, the electric machine arrangement and the gearbox for controlling their operation;

wherein the powertrain is configurable in operation so that its combustion engine is switchable between an inactive state and an active state, the combustion engine requiring to be cranked to switch it from its inactive state to its active state;

characterized in that application of cranking torque to the combustion engine is controlled in operation to substantially temporally coincide with the gearbox being engaged to couple motive power to the load of the powertrain; and wherein one or more of rotational shafts of the combustion engine and the electric machine arrangement are provided with one or more sensors for determining a measure of torque coupled to the combustion engine when cranking the combustion engine and causing it to be activated, such measure of torque being processed using a torque simulation of the powertrain executed in operation on computing hardware of the control unit for providing control of the electric machine arrangement for at least partially compensating any abrupt changes in torque occurring in the powertrain.

Such a configuration for the powertrain is of benefit in that motive power is maintained to propel the vehicle simultaneously with the combustion engine of the vehicle being activated.

Optionally, in the powertrain, whilst the gearbox is in an engaged coupling state, the combustion engine is operable to be cranked by maintaining the electric machine arrangement in a rotating state, at least partially coupling via the rotational coupling arrangement the combustion engine to the electric machine arrangement to transfer torque from the electric machine arrangement to the combustion engine, thereby accelerating the combustion engine to a threshold rotation rate, and then applying a fuel supply to the combustion engine to bring the combustion engine to an active state.

Optionally, in the powertrain, the one or more sensors are implemented as rotation rate sensors for measuring rotation rate of their one or more rotational shafts, the measure of torque being computed from inertia) moments of components parts of the powertrain and from angular acceleration temporally computed from the one or more measured rotation rates.

According to a third aspect of the present invention, there is provided a method of controlling a hybrid powertrain including:

a combustion engine;

an electric machine arrangement;

a gearbox operable to receive rotational power from one or more of the combustion engine and the electric machine arrangement, and to provide motive power to a load;

a control unit coupled in communication with the combustion engine, the electric machine arrangement and the gearbox for controlling their operation; and wherein the powertrain is configurable in operation so that its combustion engine is switchable between an inactive state and an active state, the combustion engine requiring to be cranked to switch it from its inactive state to its active state, characterized in that the method includes steps of:

receiving feedback signals derived from the powertrain and command signals at multiple-inputs of the control unit, and outputting output signals at multiple-outputs of the control unit for controlling operation of the powertrain; and applying at the control unit a torque simulation of the powertrain executable on computing hardware of the control unit, the simulation being applicable in operation to process information provided at the multiple-inputs to compute a compensation, the control unit being operable to apply the compensation at the multiple outputs to reduce an amplitude of torque jerks occurring in operation in the powertrain when the engine is switched between its active and inactive states.

Optionally, the method includes steps of:

(a) initiating a gear change by reducing torque supplied to the gearbox and then placing the gearbox in its neutral state;

(b) controlling application of cranking torque to the combustion engine to substantially temporally coincide with the gearbox being in the neutral state, the cranking torque and supply of fuel to the combustion engine being operable to cause the combustion engine to be activated; and (c) engaging the gearbox into gear and then increasing torque supplied to the gearbox.

Optionally, the method includes additional steps of:

(d) whilst the gearbox is in a neutral coupling state, cranking the combustion engine by decelerating the electric machine arrangement to substantially a standstill;

(e) at least partially coupling via a rotational coupling arrangement the combustion engine to the electric machine arrangement;

(f) applying excitation to the electric machine arrangement to rotationally accelerate the electric machine arrangement and thereby accelerating the combustion engine to a threshold rotation rate; and then (g) applying a fuel supply to the combustion engine to bring the combustion engine to an active state.

Optionally, the method includes additional steps of:

(h) whilst the gearbox is in a neutral coupling state, cranking the combustion engine by maintaining the electric machine arrangement in a rotating state;

(i) at least partially coupling via the rotational coupling arrangement the combustion engine to the electric machine arrangement to transfer torque from the electric machine arrangement to the combustion engine thereby accelerating the combustion engine to a threshold rotation rate; and then (j) applying a fuel supply to the combustion engine to bring the combustion engine to an active state.

Optionally, in the method, the coupling arrangement includes a slipping clutch operable to provide a constant-torque coupling characteristic through at least part of its slippage range.

According to a fourth aspect of the invention, there is provided a vehicle including a hybrid powertrain according to the first or second aspect of the invention.

Preferably, the vehicle is selected from a group: a bus, a truck, a construction vehicle, a van, a passenger vehicle, a boat, a ship, a stationary machine, or any type of vehicle which is required in operation to exhibit relatively high acceleration in a stop-start manner of driving.

According to a fifth aspect of the invention, there is provided a method of controlling a hybrid powertrain including:
a combustion engine;
an electric machine arrangement;
a gearbox for receiving rotational power from at least one of the combustion engine and the electric machine arrangement, and for providing motive power to a load;
a control unit coupled in communication with the combustion engine, the electric machine arrangement and the gearbox for controlling their operation; and
wherein the powertrain is configurable in operation so that its combustion engine is switchable between an inactive state and an active state, said combustion engine requiring to be cranked to switch it from its inactive state to its active state,
the method including steps of:
(a) engaging the gearbox into gear for coupling torque therethrough to provide motive power to the load;
(b) applying a cranking torque to the combustion engine and coupling a supply of fuel thereto to activate the combustion engine, such activation of the combustion engine coinciding substantially temporally with the gearbox being engaged; and
(c) wherein one or more of rotational shafts of the combustion engine and electric machine arrangement are provided with one or more sensors for determining a measure of torque coupled to the combustion engine when cranking the combustion engine and causing it to be activated, such measure of torque being processed in the control unit using a torque simulation model for providing control of the electric machine arrangement for at least partially compensating any abrupt changes in torque occurring in the powertrain.

Optionally, the method includes additional steps of:
(d) whilst the gearbox is in an engaged coupling state, cranking the combustion engine by maintaining the electric machine arrangement in a rotating state;
(e) at least partially coupling via a rotational coupling arrangement the combustion engine to the electric machine arrangement for transferring torque from the electric machine arrangement to the combustion engine thereby accelerating the combustion engine to a threshold rotation rate; and then
(f) applying a fuel supply to the combustion engine to bring the combustion engine to an active state.

Optionally, in the method, the one or more sensors are implemented as rotation rate sensors for measuring rotation rate of their one or more shafts, the measure of torque being computed by a control unit from inertial moments of components parts of the powertrain and from angular acceleration temporally computed from the one or more measured rotation rates.

According to a sixth aspect of the invention, there is provided a computer program on a data carrier, the computer program being executable on computing hardware for implementing a method according to the fourth or fifth aspect of the invention.

According to a seventh aspect of the invention, there is provided a computer program comprising computer program code means adapted to perform a method or for use in a method according to the fourth and fifth aspects of the invention when the computer program is run on a programmable microcomputer.

Preferably, the computer program is adapted to be downloaded to a powertrain according to the first or second aspect of the invention, or one or more of its components when run on a computer which is connected to the Internet.

Preferably, the computer program product is stored on a computer readable medium, comprising the aforesaid computer program code means.

According to an eighth aspect of the invention, the method for controlling a hybrid powertrain having a combustion engine, an electric machine arrangement and a gearbox operable to receive motive power from at least one of the combustion engine and the electric machine arrangement for providing corresponding motive power to a load; comprising the following steps starting from a powertrain operational state where the load is powered by means of the electric machine arrangement:
reducing an output rotational torque of the electric machine arrangement to the gearbox,
controlling the gearbox, and
cranking the combustion engine by means of the electric machine arrangement.

The method results in a powertrain operational state where the load is powered at least by means of the combustion engine.

The method is especially suitable for an acceleration procedure for a powertrain comprising a single clutch, wherein the electric machine arrangement is operationally arranged between the combustion engine and the gearbox and the single clutch is arranged between the combustion engine and the electric machine arrangement. Thus, the method creates conditions for eliminating a second clutch, which is present in many prior art solutions.

Further, the output rotational torque of the electric machine arrangement is preferably reduced to zero before the gearbox is controlled. The reduction procedure may be stepwise, ie substantially instant reduction, but the output rotational torque is preferably ramped down, ie in a gradual, continuous manner.

Further, the method steps are not necessarily performed in chronological order.

Preferably, the method comprises the steps of
shifting the gearbox to a neutral state after the reduction of the output rotational torque of the electric machine arrangement,
engaging a gear in the gearbox after shifting the gearbox to the neutral state, —ramping up an output rotational torque to the gearbox after the engagement of the gear in the gearbox,
ramping up the output rotational torque to the gearbox by means of ramping up at least the output rotational torque of the combustion engine (which is performed by injecting fuel to the engine), and
initiating injecting fuel to the engine at a predetermined speed of the engine.

The ramping up phase may be performed with a contribution of power from the electric machine arrangement.

Preferably, the method comprises the further step of synchronizing the output speed of the combustion engine before the output rotational torque of the combustion engine is ramped up.

Preferably, the method comprises the step of activating a coupling arrangement arranged between the combustion engine and the electric machine arrangement in order to crank the combustion engine by means of the electric machine arrangement. This may be performed in a plurality of ways; According to a first example, the method comprises the step of maintaining a specific rotational speed of the electric machine arrangement while simultaneously partially closing the coupling arrangement. According to a second example, the method comprises the step of decelerating the rotational speed of the electric machine arrangement to a standstill and totally closing the coupling arrangement before cranking the combustion engine by means of the electric machine arrangement.

Preferably, the method comprises the synchronizing step of detecting an output speed of the electric machine arrangement and an output speed of the combustion engine and totally closing the coupling arrangement when the detected output speed of the electric machine arrangement and the detected output speed of the combustion engine are within a predetermined speed range.

Preferably, the method comprises the step of adding an additional torque to the electric machine arrangement in order to compensate for the torque needed to crank the combustion engine. Preferably, the method comprises the step of detecting a plurality of powertrain operational parameters indicative of torque and calculating a magnitude of the additional torque on the basis of the detected powertrain operational parameters.

Preferably, the method comprises the step of cranking the combustion engine by means of the electric machine arrangement while the gearbox is in the neutral state.

Preferably, the method comprises the step of the step of cranking the combustion engine by means of the electric machine arrangement while the gearbox is in an engaged state. In this way, the total time for the procedure for starting the combustion engine and outputting torque from the engine to the gearbox may be shortened. Thus, the combustion engine is preferably cranked by means of the electric machine arrangement while an input shaft of the gearbox is engaged to the load. In this context, the method preferably comprises the step of cranking the combustion engine by means of the electric machine arrangement during the reduction of the output rotational torque of the electric machine arrangement to the gearbox or, alternatively during the ramping up of the output rotational torque to the gearbox.

In the last phase of the ramping down, there is available torque in the electric machine (ie the electric machine is not operating at its maximum or close to its maximum output rotational torque), and at least part of this available torque may be added at this stage. Similarly, in the initial phase of the ramping up there is available torque in the electric machine (ie the electric machine is not operating at its maximum or close to its maximum output rotational torque), and at least part of this available torque may be added at this stage. Thus, at both instances, there is available further torque in the electric machine, which may be used to crank the engine. Thus, during one of the defined parts of the ramp-up or ramp-down phase, the output torque of the electric machine arrangement is substantially increased (preferably to maximum output) for a short time interval in order to crank the engine.

Preferably, the method comprises the step of cranking the combustion engine by means of the electric machine arrangement after the synchronization of the output rotational torque of the combustion engine.

Preferably, the method comprises the step of cranking the combustion engine by means of the electric machine arrangement when the electric machine arrangement is in an operational state that differs substantially from an operational state in which the electric machine is operated at maximum output rotational torque.

Preferably, the method comprises the step of shifting gears in the gearbox (500) during said switching from powering the load by means of the electric machine arrangement to powering the load by means of the combustion engine.

It will be appreciated that features of the invention are susceptible to being combined in any combination without departing from the scope of the invention as defined by the accompanying claims.

DESCRIPTION OF THE DIAGRAMS

Embodiments of the present invention will now be described, by way of example only, with reference to the accompanying drawings wherein:

FIG. 1 is a schematic illustration of a hybrid powertrain described in a published U.S. Pat. No. 4,533,011;

DETAILED DESCRIPTION

In the following, embodiments of a hybrid powertrain pursuant to the present invention will be described. Thereafter, operation of the hybrid powertrains will be elucidated. Alternative implementations of the hybrid powertrains will then be described.

While in the following the invention is exemplified in embodiments of a hybrid powertrain for a vehicle, this implies in no way any restriction in regard of the application field of the invention. On the contrary the invention is usable also in many other application fields as for instance in hybrid powertrains for trains, boats, ships and stationary applications.

Figure 1:
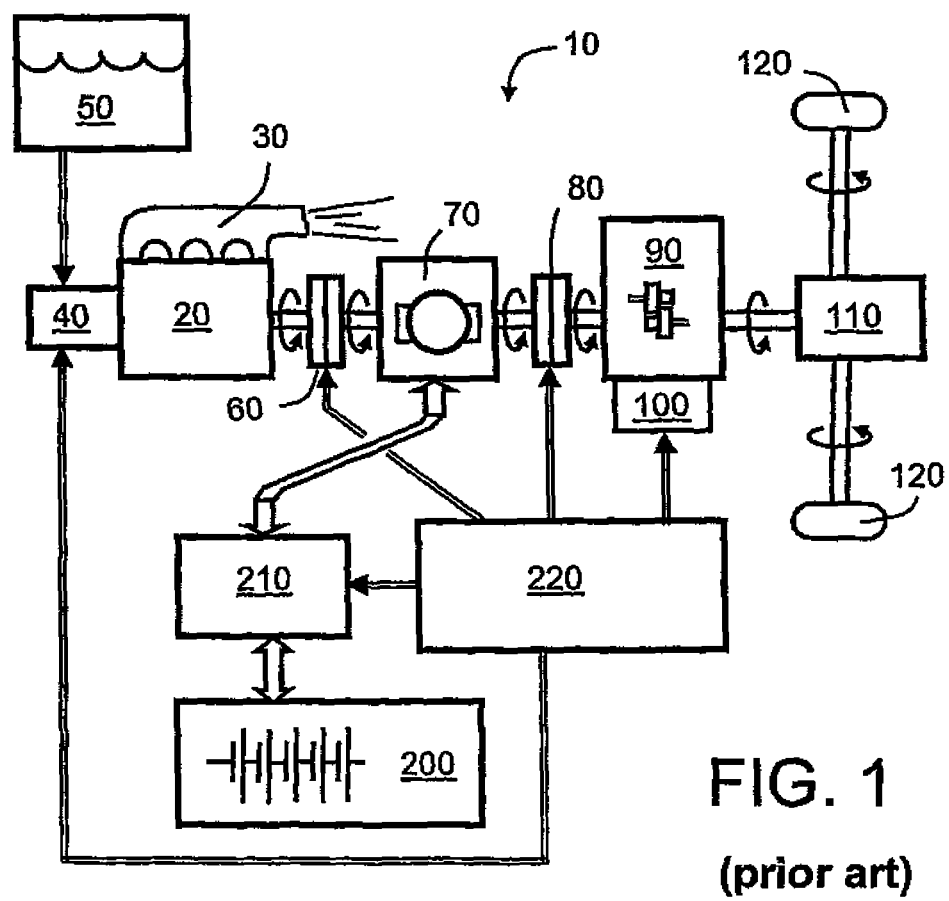
Figure 2:
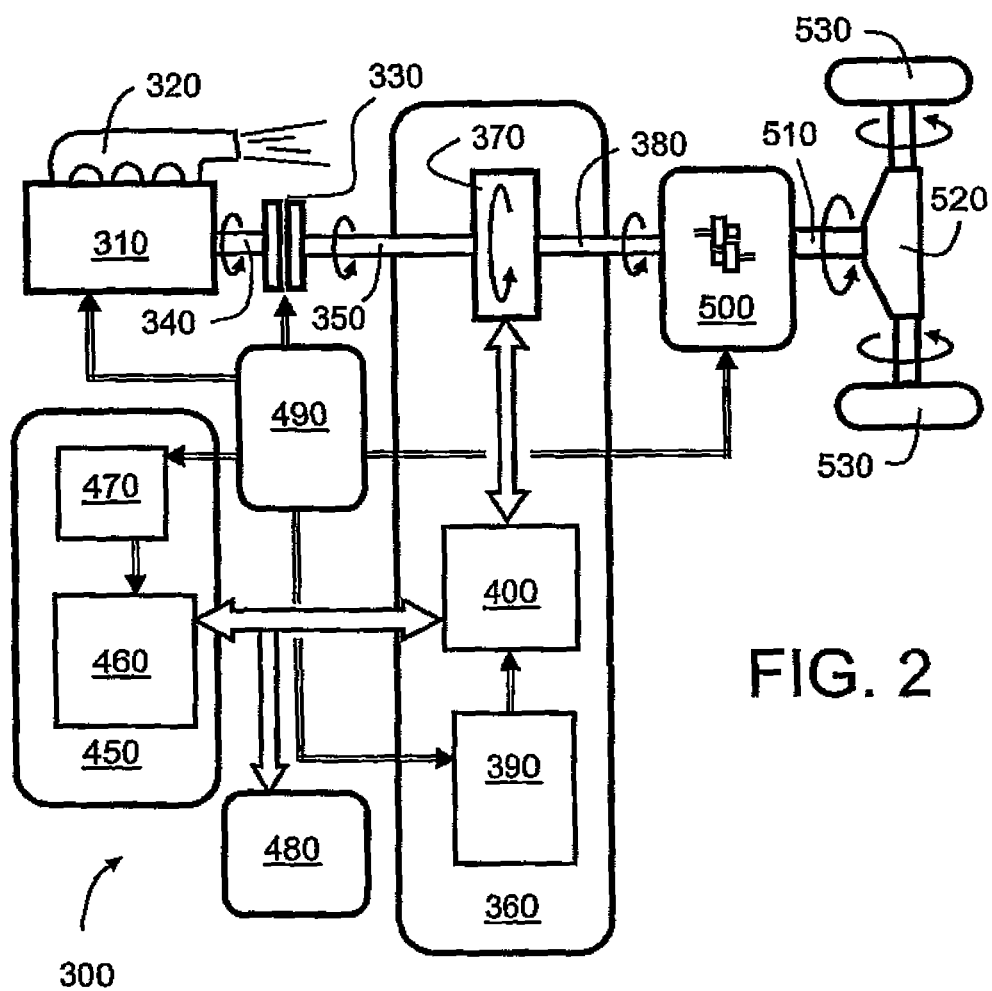
FIG. 2 is a schematic illustration of a hybrid powertrain pursuant to the present invention.

Referring now to FIG. 2, there is illustrated a hybrid powertrain indicated generally by 300. The powertrain 300 is designed to include relatively few component parts for ensuring enhanced reliability and compactness. Moreover, many of its parts are adaptations of well proven components used in vehicles throughout the world. However, the hybrid powertrain 300 differs from known powertrains in several important aspects which will be elucidated further later.

The powertrain 300 includes a combustion engine 310 with its associated exhaust manifold 320. The combustion engine 310 can either be normally aspirated or turbo-charged. Optionally, the combustion engine 310 is a diesel engine, a biogas engine or a petrol engine. An engine torque output crankshaft 340, abbreviated to output crankshaft 340, of the combustion engine 310 is rotationally coupled to a first plate of a clutch 330. A second plate of the clutch 330 is rotationally coupled via a further shaft 350 to an electric machine arrangement 360. The clutch 330 is preferably a slipping-type clutch which provides a torque coupling characteristic which will be described later with reference to FIG. 4; the clutch 330 is continuously adjustable from fully disengaged to fully engaged and degrees of torque coupling therebetween.

The electric machine arrangement 360 includes at least one electric machine 370 which not only is operable to generate rotation mechanical power and thus drive torque when excited by electrical energy, but also operable to function as a generator when configured to provide regenerative braking and thus braking torque; the electric machine 370 is thus capable of functioning both as a motor and as a generator. The electric machine 370 is optionally implemented as an induction device or as a switched reluctance device or a device based on permanent magnet technology. The electric machine arrangement 360 further includes a motor torque output shaft 380, abbreviated to output shaft 380, rotationally coupled to the electric machine 370 and also couplable via the clutch 330 to the output crankshaft 340 of the combustion engine 310 as illustrated. Additionally, the electric machine arrangement 360 includes an electric machine control unit 390 and a power electronics unit 400 for switching high-current to and from the electric machine 370 in response to it functioning as a drive motor or as a generator.

The powertrain 300 also includes an energy storage assembly 450 comprising an energy storage element 460 electrically coupled to an energy storage controller 470 for managing discharging and recharging of the energy storage element 460. The energy storage element 460 is optionally implemented as a rechargeable battery, for example using a nickel metal hydride (NiMH) battery technology, an advanced lead acid rechargeable battery technology, a lithium ion rechargeable cell technology, or a lithium polymer rechargeable cell technology. The use of super-capacitors as energy storage elements 460 is also possible. Yet more optionally, the energy storage element 460 can be implemented using for instance: a hydraulic energy storage technology, a rotating flywheel momentum-storage technology or any other type of mechanical energy storage technology combined with any suitable energy converting arrangement (not shown) converting:

(i) electrical energy produced by the electric machine 370 (functioning as generator) into an energy form suitable for storage in said energy storage element 460; and (ii) energy stored in said energy storage element 460 into electrical energy for use in the electric machine 70 (functioning as motor).

Yet more optionally, the energy storage element 460 can be implemented as a combination of several such energy storage technologies to best utilize individual charging and discharging characteristics of these technologies.

The powertrain 300 and its vehicle have associated therewith electrical auxiliaries 480, for example one or more of electrical heaters, fans, safety systems and vehicle climate control functions. These electrical auxiliaries 480 are electrically coupled to the energy storage element 460 as illustrated in FIG. 2.

The aforementioned motor torque output shaft 380 is rotationally coupled to a gearbox 500. The gearbox 500 is operable to provide several discrete gear ratios and a neutral coupling from the motor torque output shaft 380 to a final output shaft 510. The final output shaft 510 is rotationally coupled via a differential gear 520 to a load 530 of a system which is exemplified in FIG. 2 as the wheels (load) of the driven axle of the vehicle (system) in which the powertrain 300 is mounted.

The various output shafts 340, 350, 380, 510 depicted in FIG. 2 are also referred to as "rotational shafts" or "rotational output shafts".

The system is optionally: a passenger vehicle, a boat, a ship, a heavy duty vehicle such as a bus, a truck, a construction vehicle, a delivery van, or any other type of vehicle which is required in operation to exhibit relatively high acceleration in a stop-start manner of driving. However, the present invention is not limited to such vehicles. The load 530 can include wheels, propellers or similar depending on the nature of the system.

Figure 5:
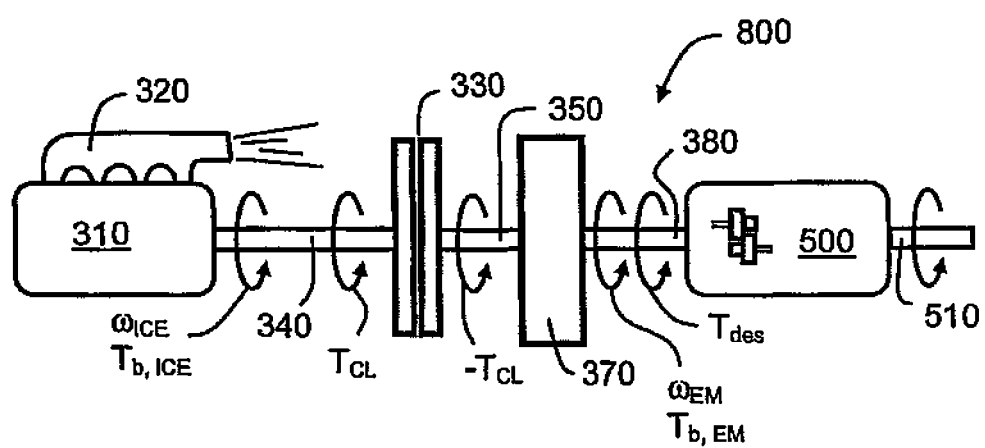
FIG. 5 is a schematic diagram illustrating various torques generated and encountered in the powertrain of FIG. 2.

The powertrain 300 is additionally provided with a central control unit 490 electrically coupled to an actuator assembly (not shown) associated with the clutch 330, to the electric machine control unit 390, to the energy storage controller 470, and to an actuator unit (not shown) associated with the gearbox 500. The central control unit 490 is operable to provide a multiple-input interface to a driver of the vehicle, for example, the central control unit 490 is coupled to receive acceleration, braking and gear-change commands from the driver. Moreover, although not illustrated in FIG. 2, the powertrain 300 includes sensors at various strategic positions in the powertrain 300 for measuring the torque, or measuring parameter signals allowing the subsequent calculation or estimation of the torque, as shown in FIG. 5; the sensors are beneficially implemented as rotation rate sensors, for example tachometers implemented as optical or inductive encoders, operable to generate signals; from the signals, a measure of the torque can be computed from angular acceleration dω/dt using Equation 1 (Eq. 1)

$$T = I\frac{dw}{dt} \qquad \text{Eq. 1}$$

wherein
T=torque; and
I=moment of inertia.

The central control unit 490 is operable to perform various functions which will be elucidated later concerning interaction of the combustion engine 310, the clutch 330, the electric machine arrangement 360 and the gearbox 500. Moreover, the central control unit 490 is beneficially implemented using computing hardware comprising one or more computers.

In general, hybrid powertrains known in the state of the art are susceptible in operation to exhibiting abrupt changes in torque, namely torque "jerks". A possible solution for decreasing the effect of such unwanted jerks is to employ two disconnecting clutches as disclosed in the aforementioned published U.S. Pat. No. 4,533,011. However, such a possible solution is undesirable, especially in the case of large vehicles such as buses and trucks. The aforementioned published U.S. Pat. No. 4,533,011 is concerned with personal vehicles such as personal automobiles, small cars and similar. In the case of a typical powertrain for a larger type of hybrid vehicle, the combustion engine is capable of developing many hundreds of kilowatts of mechanical power; the electric motor is similarly rated to deliver a mechanical power output in the order of 100 kW, potentially 200 kW or more. Thus, pursuing the solution described in published U.S. Pat. No. 4,533,011 results in increased cost, in increased weight, in increased size of the powertrain, and in a decrease in reliability of the powertrain on account of more component parts corresponding to more items which can potentially fail in use. Thus, in summary, the powertrain 300 according to the invention illustrated in FIG. 2 represents a different configuration to that disclosed in the U.S. Pat. No. 4,533,011.

Operation of the powertrain 300 will now be described with reference to FIG. 2. The central control unit 490 is programmed to activate the combustion engine 310 periodically so as to operate it at a most efficient part of its thermal operating regime so as to enable the combustion engine 310 to provide enhanced fuel economy for the powertrain 300. Beneficially, the combustion engine 310 is of tuned design. There are therefore periods during which the combustion engine 310 is in a deactivated state without fuel being supplied thereto. When the combustion engine 310 is in the deactivated state, the clutch 330 is beneficially actuated by the central control unit 490 to be in a disengaged state. As described earlier, the clutch 330 is at least partially engaged to couple torque from the combustion engine 310 when the combustion engine 310 is in its activated state with fuel supplied thereto. The central control unit 490 is programmed to control the operation of the electric machine 370, the clutch 330 and the combustion engine 310 so that deactivation and activation of the combustion engine 310 occurs in the powertrain 300 without substantially inducing any noticeable torque jerks. Such a characteristic is especially important when the powertrain 300 is employed in a bus which transports in operation passengers in a standing position, the bus being required to accelerate smoothly and rapidly in urban environments so as not to unduly impede traffic flow and yet be as fuel efficient as possible to meet economic and fuel emission constraints.

Figure 4:
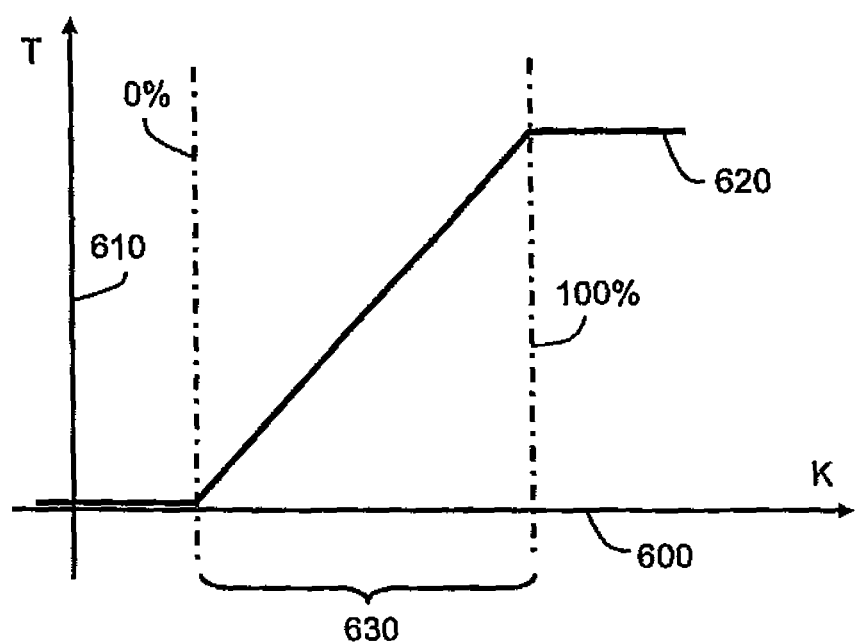
FIG. 4 is a graph illustrating torque coupling characteristics of a clutch employed in the powertrain of FIG. 2.

Referring to FIG. 4, the clutch 330 is operable to provide substantially a constant torque transfer therethrough when in a slipping state for a given slip selected for its clutch plates. In FIG. 4, an abscissa axis 600 denotes increasing coupling K through the clutch 330 with coupling K increasing from left to right. Moreover, in FIG. 4, there is also included an ordinate axis 610 denoting torque transferred through the clutch 330 between the aforementioned shafts 340, 350; the torque T increase from bottom to top along the ordinate axis 610. The torque T transferred through the clutch 330 as a function of the coupling K is denoted by a curve 620 and is included in an intermediate region 630. When the coupling K is 0%, the two shafts 340, 350 are mutually decoupled. Moreover, when the coupling K is 100%, the shafts 340, 350 are coupled together and rotate in mutually angular synchronization. In the intermediate region 630 of coupling K, the clutch 330 is operable in its slipping mode wherein the clutch 330 is operable to couple a constant value of torque T for a given corresponding value of the coupling K as illustrated. Such a characteristic is highly beneficial in that torque jerks generated by the combustion engine 310 when being started coincident with the clutch 330 being operated in the region 630 results in the clutch 330 functioning as a filter for sudden variations in torque. This characteristic is advantageously used in the present invention to enable the powertrain 300 to smoothly deliver power to the wheels 530 whilst the combustion engine 310 is being started to its activated state. When a sudden change in torque coupled through the clutch 330 occurs, for example in response to the combustion engine 310 changing from an inactive state, whereat it represents a drag torque, to an active state, whereat it represents a source of drive torque, a step change in torque is susceptible to propagating through the powertrain 300 as a torque jerk. When such a step change causes the clutch 330 to change abruptly from a slipping state to a synchronized state, the clutch 330 no longer provides its torque-variation filtering characteristic, thereby resulting in a step change of torque, namely potentially a jerk, to propagate through the powertrain 300; however, the present invention is operable to reduce propagation of such jerks.

Figure 3:
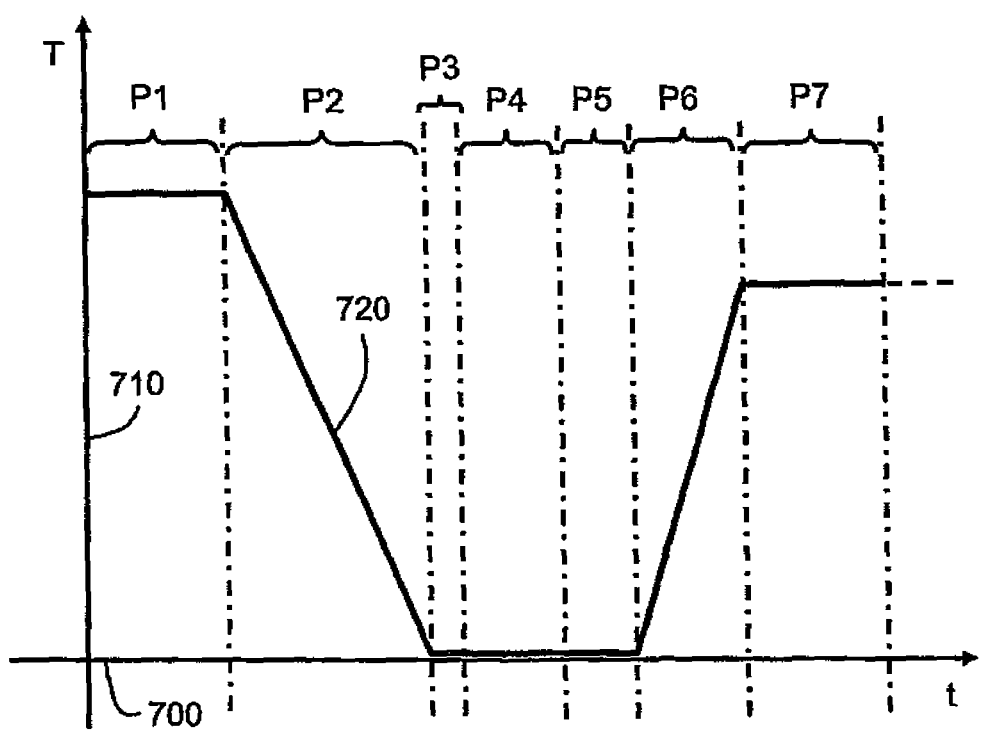
FIG. 3 is a graph illustrating a combustion engine cranking procedure employed in the hybrid powertrain illustrated in FIG. 2.

The central control unit 490 is operable to selectively employ two different procedures to start the combustion engine 310 whilst causing a considerable decrease of the (unwanted) effect of jerks or interruptions of driving torque available at the output shaft 510 of the powertrain 300. The first procedure will be described with reference to FIG. 3 wherein an abscissa axis 700 denotes elapsed time from left to right, and wherein an ordinate axis 710 denotes torque delivered through the gearbox 500 to the wheels 530. A curve 720 denotes the driving torque T provided via the gearbox 500 during transition phases P1 to P7.

In a first procedure, the following steps are followed:

(a) in the phase P1, the combustion engine 310 is in a deactivated state, the electric machine 370 is energized from the energy storage element 460 for providing drive torque through the gearbox 500 to the load 530;

(b) during the phase P2, electric power provided from the energy storage element 460 to the electric machine 370 is gradually reduced in a ramped manner so as to reduce a torque being experienced by gear wheels included in the gearbox 500;

(c) in the phase P3, the central control unit 490 instructs actuators associated with the gearbox 500 to the shift the gearbox 500 to neutral so as to decouple the shafts 380, 510;

(d) in the phase P4, the clutch 330 is at least partially engaged and electrical power is then applied to the electric machine 370 to crank the combustion engine 310 for a time period in a typical range of 50 milliseconds to 2 seconds, more optionally 0.25 seconds to 1 second; during this period, fuel supply to the combustion engine 310 is commenced to bring the combustion engine 310 to its activated state; when the combustion engine 310 is operating in a stable manner, the clutch 330 is then optionally fully engaged, namely the coupling K=100%;

(e) during the phase P5, the central control unit 490 is operable to adjust at least one of fuel supply rate to the combustion engine 310 and electric power supplied to the electric machine 370 so as to synchronize a mutual rate of rotation of the shafts 380, 510, and then the gearbox 500 is engaged into gear;

(f) during the phase P6, the central control unit 490 is operable to increase the torque output from at least one of the electric machine 370 and the combustion engine 310; and (g) during the phase P7, the torque delivered to the gearbox 500 is varied in response to demand received from the driver at the central control unit 490.

In step (d), partial engagement of the clutch 330 can optionally be used to at least partially filter torque jerk transfer between the combustion engine 310 and the electric motor 370.

The first procedure can be implemented in several different ways. In the step (d) corresponding to the phase P4:

(i) the electric machine 370 can be driven at a specific rotation speed using the electric machine control unit 390 receiving commands from the central control unit 490. The clutch 330 is then partially engaged so that the coupling K is less than 100% to transfer an appropriate torque to accelerate the output shaft 340 of the combustion engine 310. When the output shaft 340 of the combustion engine 310 has attained a sufficiently high speed, fuel supply to the combustion engine 310 is commenced to bring the combustion engine 310 to its activated state. Optionally, the clutch 330 is then adjusted to provide full torque coupling therethrough, namely the coupling K=100%; or alternatively (ii) the electric machine 370 is brought to a standstill, for example by regenerative braking so that its rotational energy is transferred to recharge the energy storage element 460. The clutch 330 is next fully engaged so that the coupling K=100%. The electric machine 370 is then applied to provide torque to crank the output shaft 340 of the combustion engine 310 and thereby accelerate the output shaft 340 of the combustion engine 310. When the output shaft 340 is rotating at a sufficiently high rotation rate, fuel is supplied to the combustion engine 310 to activate the combustion engine 310.

Option (i) potentially requires less time to bring the combustion engine 310 into operation.

Option (ii) is potentially more energy efficient.

Importantly, the procedures P1 to P7 are beneficially implemented in conjunction with a gear change in the gearbox 500 as step (c) corresponding to the phase P3 requires that the gearbox 500 be placed in neutral. Implementation of the first procedure in conjunction with a gear change may cause the gear change to be slightly prolonged in comparison to a corresponding simple gear change wherein the combustion engine 310 is not activated. However, in practice, the prolongation is not found to be a problem, especially in larger systems such as trucks, buses, boats, ships and similar.

In certain situations in which the powertrain 300 is required to operate, it is advantageous that power transmission to the load 530, for example wheels, is not interrupted during activation of the combustion engine 310. Such a situation arises, for example, when a bus is used in urban environments subject to stringent exhaust emission controls and when the bus is required to accelerate in a smooth manner to merge with urban traffic without causing passengers within the bus to experience jerks which could represent a safety issue.

The inventor has appreciated two important issues, namely:

(a) the clutch 330 in its slipping range 630 is susceptible to providing filtering of torque jerks; and (b) the electric motor 370 can be very precisely controlled, more so than the combustion engine 310 by way of controlling its fuel supply, so that its torque and rotational momentum can be rapidly varied.

Such appreciation is important when describing a second procedure pursuant to the present invention for activating the combustion engine 310; a transition from the combustion engine 310 being inactive and causing a drag torque to being active and causing a drive torque can result in a sudden change in torque coupled through the clutch 330, for example causing the clutch 330 to promptly achieve synchronization therethrough.

Firstly, for describing the second procedure, torque balances within the powertrain 300 will firstly be elucidated. Referring to FIG. 5, a torque Tdesis defined as being a torque which is desirable to deliver to the gearbox 500 when the gearbox 500 is engaged in gear. A torque 7&, EM is defined as a torque delivered by the electric machine 370 which is coupled directly to the gearbox 500 as shown in FIGS. 2 and 5; "EM" is an abbreviation for "electric machine". However, when the combustion engine 310 is in a deactivated state and the clutch 330 is at least partially engaged causing a dragging torque TCu for example in the region 630 in FIG. 4, Equation 2 (Eq. 2) describes the available torque Tdes at the input of the gearbox 500:

$$T_{des} = T_{b,EM} - T_{CL} \qquad \text{Eq. 2}$$

Thus, when the clutch 330 is fully disengaged such that the coupling K=0%, Equation 3 (Eq. 3) describes a situation of pure electric drive in the powertrain 300:

$$T_{des} = T_{b,EM} \qquad \text{Eq. 3}$$

In order to achieve to smooth cranking of the combustion engine 310 when the gearbox 500 is engaged in gear, the central control unit 490 is operable to precisely control excitation to the electric machine 370 so as to achieve a torque set-point Tsef_EM defined by Equation 4 (Eq. 4):

$$T_{set,EM} = T_{b,EM} = T_{des} - T_{CL} \qquad \text{Eq. 4}$$

The inventor has appreciated that the torque TCL coupled through the clutch 330, "CL" being an abbreviation for "clutch", can be measured with torque sensors for implementing the present invention; however, high precision torque sensors tend to be expensive. Moreover, the inventor has appreciated that the torque TCL can also be estimated from the aforementioned coupling K defining a degree of slippage between plates of the clutch 330; however, such estimation is difficult to determine precisely and prone to drift as the clutch 330 wears. In order to provide a more optimal method of measuring the torque Ta coupled through the clutch 330, the inventor has appreciated that relationship in Equation 1 (Eq. 1) can be employed provided moments of inertia are known, namely by measuring angular acceleration ˆI61. Thus, from Equations 2 to 4, Equation 5 (Eq. 5) can be derived:

$$T_{CL} = I_{ICE}\frac{dw_{ICE}}{dt} - T_{b,ICE} = I_{ICE}\frac{dw_{ICE}}{dt} + T_{fric,ICE} - T_{ind,ICE} \qquad \text{Eq. 5}$$

wherein $T_{fric,ICE}$=internal friction of the combustion engine 310; and
$T_{ind,ICE}$=indicated torque developed by the combustion engine 310, wherein "ICE" is an abbreviation for "internal combustion engine".

Thus, by knowing the inertial moment of the combustion engine 310, frictional drag within the combustion engine 310 and mechanical power being delivered by the combustion engine 310, the torque TCL can be computed to enable the central control unit 490 selectively to apply excitation to the electric machine 370 according to Equation 4 to compensate for any torque jerks encountered when activating the combustion engine 310, for example caused by sudden synchronization of the clutch 330 as the engine 310 is activated into operation to provide drive torque therefrom.

Optionally, the second procedure can also be applied during gear changes to achieve a very smooth characteristic from the powertrain 300 when activating its combustion engine 310.

Although the first and second procedures for activating the combustion engine 310 have been described in the foregoing, deactivation of the combustion engine 310 can also result in vibrations as its shaft rotation frequency passes through various mechanical resonance modes of the combustion engine 310. Optionally, with the gearbox 500 set to neutral, the electric machine 370 can be used to apply a strong regenerative braking force to bring the output shaft 340 of the combustion engine 310 more or less promptly to a stationary state after the fuel supply has been interrupted to the combustion engine 310, thereby reducing the transition period from the activated state into the deactivated state in which the aforesaid vibration modes can be excited.

Such rapid deceleration of rotation of the output shaft 340 can involve using energy recovered by the electric machine 370 to recharge the energy storage element 460.

As elucidated earlier, the central control unit 490 is operable to compute using a simulation of torque balances pursuant to Equation 5 (Eq. 5) a magnitude of torque jerks arising in the powertrain 300 and use a value of torque imbalances giving rise to such torque jerks to derive a suitable control signal for determining instantaneous power to be delivered to the electrical machine 370 for substantially negating and thereby avoiding such torque jerks. Optionally, the control unit 490 is also operable to provide torque damping as illustrated schematically in FIG. 6 wherein a variant of the aforesaid powertrain 300 is indicated generally by 1000. The variant powertrain 1000 includes shaft rotation rate sensors on the output shaft 380 to sense the rotation rate $\omega_{EM}$, and on the final output shaft 510 to sense a drive output shaft rotation rate $\omega_{SH}$. When the combustion engine 310 is one or more of kranked, started and deactivated, a torque $T_{s,\,OP}$ supplied at the final output shaft 510 should ideally not be subject to abrupt torque changes, irrespective of whether or not the gearbox 500 is coupled, and coupling status of the clutch 330 for providing a totally smooth power transmission characteristic.

Optionally, an angularly-compliant torque spring 1010 is included in-line with the clutch 330. The torque spring 1010 exhibits an angular difference 60 between the shafts 340, 350 proportional to an instantaneous difference between the torques $T_{b,ICE}$ and $T_{b,EM}$. On account of the torque $T_{b,EM}$ generated by the electric machine 370 being rapidly changeable in response to power applied thereto, the rotation rate ωEM can be sensed, for example using an optical tachometer or inductive rotational sensor, and fed back negatively in the control unit 490 via a feedback function F1 to cause the electric machine 370 to maintain a relatively smoothly changing rotation rate COEM in response to sudden changes in the torque $T_{b,ICE}$ supplied via the clutch 330 from the combustion engine 310. Optionally the function F1 is a proportional-integral-derivative (PID) feedback function although other feedback functions can alternatively be employed. When a PID feedback function is employed for the function F1 with proportional, integral and difference coefficients $C_P$, $C_I$, $C_D$, these coefficients can be individually controlled in the central control unit 490 and are optionally dynamically variable in response to operating conditions of the powertrain 1000. On account of the sensor used to measure the rotation rate $\omega_{EM}$ being mounted in respect of the same shaft as a rotor of the electric machine 370, instantaneous backlash and rotational propagation delay are not substantially encountered. Optionally, in order to further increase smoothness in response of the powertrain 1000, a further rotation rate sensor is included to monitor the rotation rate $\omega_{SH}$ which is fed back negatively via feedback function F2 to cause the electric machine 370 to maintain a relatively smoothly changing rotation rate $\omega_{EM}$ in response to sudden changes in the torque $T_{b,\,ICE}$ supplied via the clutch 330 from the combustion engine 310.

On account of backlash potentially occurring in the gearbox 500, the feedback function F2 is beneficially arranged to exhibit a longer time constant than the feedback function F1. Optionally the function F2 is also a proportional-integral-derivative (PID) feedback function although other feedback functions can alternatively be employed. When a PID feedback function is employed for the function F2 with proportional, integral and difference coefficients $C_P$, $C_I$, $C_D$, these coefficients can be individually controlled in the central control unit 490 and are optionally dynamically variable in response to operating conditions of the powertrain 1000.

Figure 6:
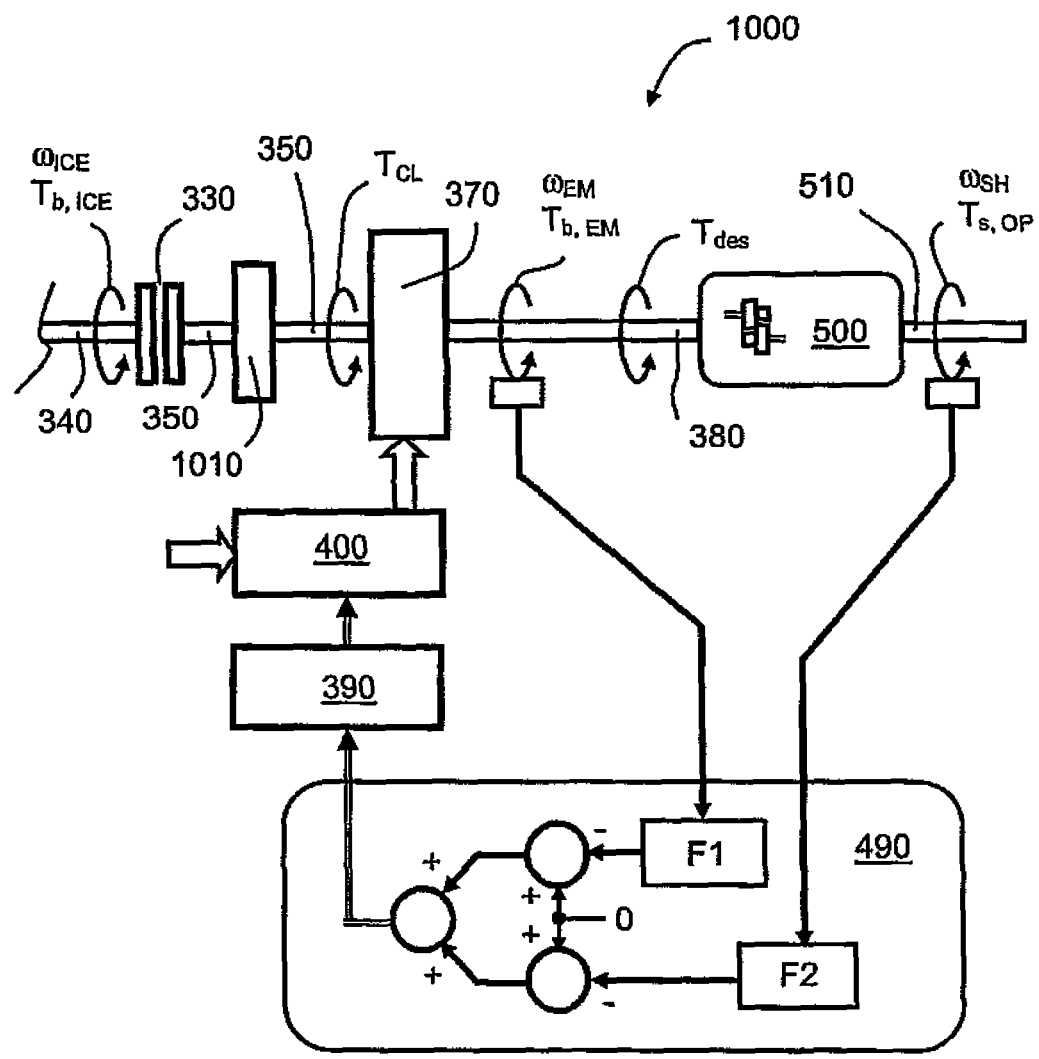
FIG. 6 is a schematic illustration of a feedback loop included in the hybrid powertrain of FIG. 2 for reducing an amplitude of torque jerks occurring when the powertrain is in operation.

Optionally, one or more of the feedback functions F1, F2 are implemented using software executable on computing hardware of the central control unit 490. More optionally, feedback coefficients, namely gain factors, employed for implementing one or more of the functions F1, F2 are dynamically variable in response to starting and stopping the combustion engine 310 and/or in response to changing gear in the gearbox 500. Thus, by employing a feedback arrangement as depicted in FIG. 6, torque jerks resulting from starting and stopping of the combustion engine 310 are susceptible to being at least partially compensated by the electric machine 370 whilst avoiding any tendency to excite dynamic oscillations in shaft rotation rates.

As elucidated in the foregoing, with reference to Equation 5 (Eq. 5), the central control unit 490 is operable to employ a torque balance computation Mexp to determine a most suitable instantaneous torque to be provided from the electric machine 370 to at least partially compensate for torque jerks arising from starting and stopping the combustion engine 310, optionally assisted by slipping occurring in the clutch 330. Such compensation using computations based on the torque balance elucidated in Equation 5 (Eq. 5) can be supplemented by feedback to compensate for sudden torque variations as depicted in FIG. 6 and as elucidated in the foregoing for obtaining superlative performance.

Figure 7:
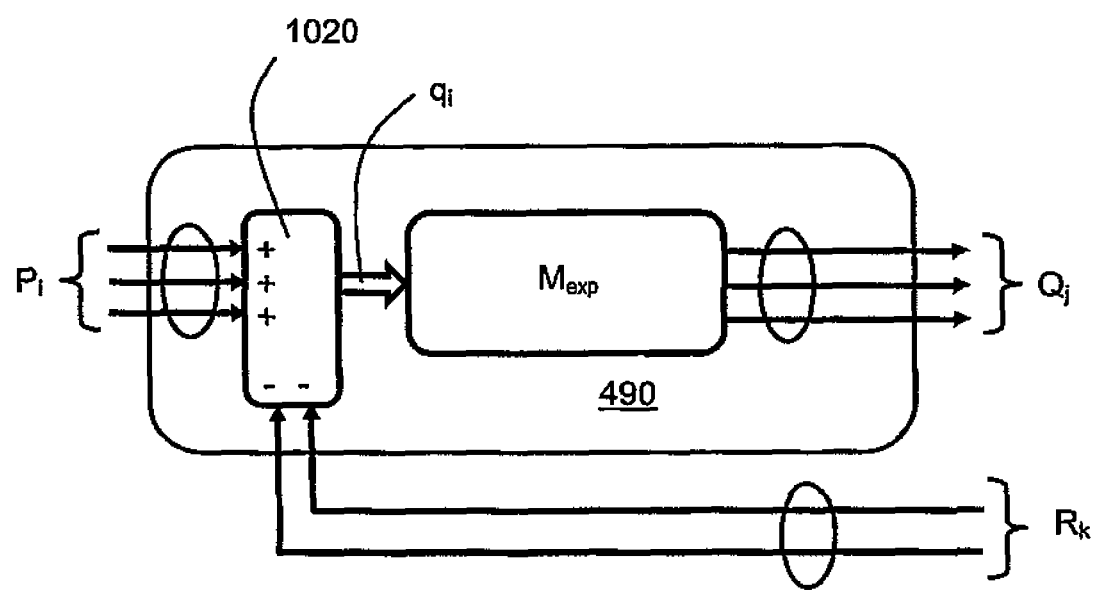
FIG. 7 is an illustration of control functions utilized in a central control unit of the hybrid powertrain of FIG. 2, the control functions being operable to reduce an occurrence of torque jerks in the hybrid powertrain when in operation.
Figure 8:
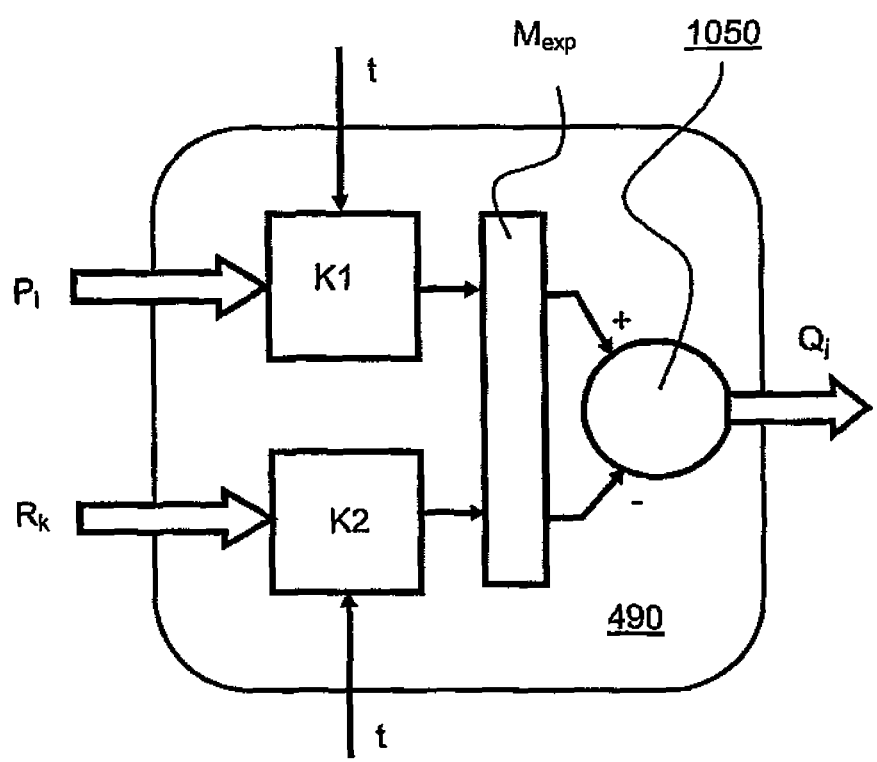
FIG. 8 is a depiction of mathematical computations executed within the central control unit as shown in FIG. 7.

Referring to FIG. 7, the central control unit 490 is arranged to implement a feedback control function substantially as illustrated; an alternative representation of the control function is provided in FIG. 8 by way of example. Input parameters $P_1$ to the control unit 490 can include one or more of:

(a) a power demand defined by an operator of the powertrain 300, 1000; for example when the powertrain 300, 1000 is mounted in a vehicle to propel the vehicle, the power demand corresponds to a degree to which a driver of the vehicle depresses an accelerator pedal of the vehicle;

(b) a gearing ratio selected by the operator, for example a preferred gear and/or an instruction to shift up or shift down a gear of the gearbox 500;

(c) a load to be driven by the powertrain 300, 1000; for example, when the powertrain 300, 1000 is mounted to propel a vehicle, a load being transported by the vehicle, for example a number of persons being transported in bus (i.e. whether the bus is fully loaded or lightly loaded), is a useful operating parameter for the control unit 490 to use;

(d) a terrain over which the powertrain 300, 1000 when configured to propel a vehicle; optionally, the vehicle is provided with a global positioning sensor (GPS) which is operable to determine a GPS position of the vehicle on the Earth's surface, the control unit 490 being provided with access to a map database for determining from the GPS position a gradient profile over which the vehicle is traveling and/or an indication of steering maneuvers that the vehicle is shortly required to undertake; the control unit 490 is beneficially programmed to anticipate gear changes and/or a requirement to automatically stop or start the combustion engine 310 so as to provide the vehicle with an optimally smooth drive torque characteristic to its wheels substantially devoid on any torque jerks arising from stopping and starting the combustion engine 310; optionally, the control unit 490 is operable to monitor the GPS position at regular intervals to determine whether or not the GPS position corresponds, for example by referring to a database, to any special conditions or restrictions such as clean air zones wherein the powertrain 300, 1000 is restricted to functioning using only the electric machine 370 with the combustion engine 310 in inactive state within the clean air zone;

(e) a vehicle steering angle when the powertrain 300, 1000 is mounted on a vehicle to propel the vehicle;

(f) a braking demand when the powertrain 300, 1000 is mounted on a vehicle to propel the vehicle, the braking demand being used to reduce a speed of the vehicle; optionally, such braking is implemented as regenerative braking for storing kinetic energy of the vehicle as stored energy in the energy storage element 460; the control unit 490 is operable to control a flow of energy from the electric machine 370 to the energy storage element 460.

The control unit 490 includes a multi-parameter difference computational function 1020 for receiving the input parameters $P_1$, and for applying a first matrix transformation K1 at temporal intervals to the input parameters $P_i$ to generate corresponding first intermediate parameters $P_{mi,t}$ as described by Equation 7 (Eq. 7):

$$[P_{mi,t}] = [K1][P_i(t)] \quad \text{Eq. 7}$$

Moreover, the control unit 490 includes in the computational function 1020 an input for feedback parameters denoted by Rk. The feedback parameters Rk include one or more of:

(g) rotation rates of one or more of the shafts 340, 350, 380, 510;

(h) whether or not the combustion engine 310 is in operation and consuming fuel;

(i) an adjustment of the clutch 330 regarding to coupling therethrough and slippage occurring therein;

(j) a degree of power being delivered to, or generated by, the electric machine 370; and (j) a torque being delivered at the shaft 510, for example as sensed by using a torque sensor mounted thereto.

The multi-parameter difference computational function 1020 is further operable to apply a second matrix transformation K2 at temporal intervals to the feedback parameters RK to generate corresponding second intermediate parameters $R_{mi,t}$ described by Equation 8 (Eq. 8):

$$[R_{mi,t}] = [K2][R_k(t)] \quad \text{Eq. 8}$$

The first and second intermediate parameters are then provided to a model representation of Equation 5 (Eq. 5), namely a torque simulation, describing a balance of torques within the powertrain 300, 1000. Error parameters $Q_i$ are generated by a multi-parameter subtraction function 1050 as depicted by Equation 9 (Eq. 9) using the aforesaid torque balance equation (Eq. 5):

$$Q_i = [M_{exp}(t)[P_{mi,t}] - [R_{mi,t}]] \quad \text{Eq. 7}$$

The error parameters $Q_i$ are employed to drive the gearbox 500, the electric machine 370, the clutch 330, the combustion engine 310 and also optionally damping parameters for feedback as a function of time t as depicted in FIG. 6.

By using such sophisticated feedback control in the central control unit 490, performance of the powertrain 300, 1000 can be considerably enhanced, especially with regard to more precisely counteracting torque jerks generated when the combustion engine 310 is periodically activated and subsequently deactivated.

Operation of a vehicle including one of the powertrains 300, 1000 will now be described by way of example.

In a first example, the vehicle is traveling along a road whose road surface is substantially horizontal, the vehicle being propelled solely by the electric machine 370 provided with power from the energy storage element 460. A driver of the vehicle further depresses an accelerator pedal of the vehicle causing the control unit 490 to apply more power to the electric machine 370.

When the electric machine 370 approaches its maximum allowable rotation rate, the control unit 490 decouples the gearbox 500 from the electric machine 370, and then uses the electric machine to crank the combustion engine 310 to bring the combustion engine 310 to its active state. Thereafter, the control unit 490 instructs the gearbox 500 to shift up a gear and then engages the electric machine 370 now rotationally coupled via the clutch 330 to the combustion engine 310 in its active state. On account of starting the combustion engine 310 using the electric machine 370 whilst the gearbox 500 is disengaged, torque jerks are substantially not experienced by the driver of the vehicle.

In a second example concerning the vehicle, the vehicle is traveling along a road in an up-hill direction whilst being propelled solely by the electric machine 370. A driver of the vehicle further depresses the accelerator pedal. From the GPS position of the vehicle, the control unit 490 determines from the GPS position referred to a map database that the vehicle is approaching a crest of a hill with a long down-hill slope thereafter. The control unit 490 computes it to be beneficial to continue propelling the vehicle using solely the electric machine 370 and shift the gearbox 500 up one gear in response to the accelerator pedal being further depressed. The vehicle soon approaches the crest of the hill and accelerates thereafter down-hill such that the electric machine 370 is used by the control unit 490 as a regenerative brake for charging the energy storage element 460 and thereby preventing the vehicle attaining excess speed as a result of gravitational force. When the vehicle approaches a lower region of the down-hill slope of the hill, the control unit 490 then eventually elects to start the combustion engine 310 using momentum acquired by the vehicle traveling down the hill with the electric machine 370 operable to compensate for any instantaneous torque jerks arising as the combustion engine 310 achieves its active state. The control unit 490 has thereby circumvented from a need to operate the combustion engine 310 when approaching the top of the hill and subsequently traveling down the hill.

The invention is thereby not only capable of reducing wear to the combustion engine 310 but also reducing total fuel consumption of the vehicle. Although torque jerks are most effectively avoided by activating the combustion engine 310 whilst the gearbox 500 is disengaged from the electric machine 370, it will be appreciated that the control unit 490 is also capable of reducing a perceived magnitude of torque jerks occurring when the combustion engine 310 is started via the clutch 330 simultaneously with drive being coupled via the gearbox 500 to propel the vehicle; the magnitude is achieved by torque compensation based upon a torque computation performed substantially pursuant to Equation 5 (Eq. 5) in the foregoing. Weight of the vehicle is also an important factor determining a load required to be hauled up-hill as well as determining an amount of energy that can be obtained by applying regenerative braking and is hence a useful parameter to provide as input to the control unit 490. The weight of the vehicle can be beneficially determined by strain sensors associated with suspension arrangements of the vehicle.

Although the present invention has been described in the foregoing in respect of the powertrains 300, 1000, it will be appreciated that the present invention is not limited to use in such a configuration and can be adapted for use with other configurations of powertrain. Modifications to embodiments of the invention described in the foregoing are thus possible without departing from the scope of the invention as defined by the accompanying claims.

The central control unit 490 is implemented as configuration of one or more computers coupled within the powertrains 300, 1000 as illustrated in FIGS. 2 to 8 with associated description in the foregoing. Optionally, the control unit 490 corresponds to arrays of data processors spatially disposed around the powertrains 300, 1000, the array of processors being mutually interconnected via communication networks, for example via a CAN bus or similar. Moreover, the central control unit 490 is operable to execute one or more software products for implementing the invention. Furthermore, the control unit 390 beneficially includes an interface for receiving such one or more software products from a source external to the powertrains 300, 1000, thereby rendering the central control unit 490 remotely upgradeable with new versions of the one or more software products. The interface can be implemented as an electrical connector for receiving a solid state read-only-memory (ROM), an optical disc, a magnetic disc functioning as a data carrier for the one or more software products. Alternatively, or additionally, the interface includes a wireless communication link enabling one or more software products to be downloaded to the central control unit 490 via a data-carrying wireless signal, for example via proprietary Blue Tooth or mobile telephone (cell-phone) communication networks. Optionally, one or more software products can be downloaded to the central control unit 490 via a data communication network, for example via the Internet.

Although use of the powertrains 300, 1000 have been described in the foregoing in respect of vehicles, for example buses and trucks, it will be appreciated that it can be employed also in other types of systems, for example passenger vehicles, trams, trains, boats, ships and stationary power-delivery systems.

Expressions such as "including", "comprising", "incorporating", "consisting of, "have", "is" used to describe and claim the present invention are intended to be construed in a non-exclusive or non-exhaustive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A method for controlling a hybrid powertrain having a combustion engine, an electric machine arrangement and a gearbox operable to receive motive power from at least one of the combustion engine and the electric machine arrangement for providing corresponding motive power to a load, comprising the following steps starting from a powertrain operational state where the load is powered by the electric machine arrangement:
   reducing an output rotational torque of the electric machine arrangement to the gearbox,
   controlling the gearbox by changing from one gear ratio to another after reducing the output rotational torque of the electric machine arrangement to the gearbox,
   after reducing the output rotational torque of the electric machine arrangement to the gearbox and after changing from one near ratio to another, cranking the combustion engine by engaging a clutch between the combustion engine and the electric machine arrangement and supplying torque from the electric machine to the combustion engine while an input shaft of the gearbox is engaged to the load, and
   while cranking the combustion engine, adding an additional torque to the electric machine arrangement by producing, under control of a central control unit, more torque with the electric machine arrangement in order to compensate for the torque needed to crank the combustion engine.

2. A method according to claim 1, comprising reducing the output rotational torque of the electric machine arrangement by ramping it down.

3. A method according to claim 1, comprising shifting the gearbox to a neutral state after the reduction of the output rotational torque of the electric machine arrangement.

4. A method according to claim 3, comprising engaging a gear in the gearbox after shifting the gearbox to the neutral state.

5. A method according to claim 4, comprising ramping up an output rotational torque to the gearbox from at least one of the electric machine assembly and the combustion engine after the engagement of the gear in the gearbox.

6. A method according to claim 5, comprising ramping up the output rotational torque to the gearbox by means of ramping up at least the output rotational torque of the combustion engine.

7. A method according to claim 6, comprising ramping up the output rotational torque of the combustion engine by Injecting fuel to the engine.

8. A method according to claim 7, comprising initiating injecting fuel to the engine at a predetermined speed of the engine.

9. A method according to claim 6, comprising synchronizing the output speed of the combustion engine before the output rotational torque of the combustion engine is ramped up.

10. A method according to claim 9, comprising cranking the combustion engine by means of the electric machine arrangement after the synchronization of the output rotational torque of the combustion engine.

11. A method according to claim 5, comprising cranking the combustion engine by means of the electric machine arrangement during the ramping up of the output rotational torque to the gearbox.

12. A method according to claim 3, comprising cranking the combustion engine by means of the electric machine arrangement while the gearbox is in the neutral state.

13. A method according to claim 1, comprising activating a coupling arrangement arranged between the combustion engine and the electric machine arrangement in order to crank the combustion engine by means of the electric machine arrangement.

14. A method according to claim 13, comprising maintaining a specific rotational speed of the electric machine arrangement while simultaneously partially closing the coupling arrangement.

15. A method according to claim 13, comprising decelerating the rotational speed of the electric machine arrangement to a standstill and totally closing the coupling arrangement before cranking the combustion engine by means of the electric machine arrangement.

16. A method according to claim 13, comprising detecting an output speed of the electric machine arrangement and an output speed of the combustion engine and totally closing the coupling arrangement when the detected output speed of the electric machine arrangement and the detected output speed of the combustion engine are within a predetermined speed range.

17. A method according to claim 1, comprising detecting a plurality of powertrain operational parameters indicative of torque and calculating a magnitude of the additional torque on the basis of the detected powertrain operational parameters.

18. A method according to claim 1, comprising cranking the combustion engine by means of the electric machine arrangement while the gearbox is in an engaged state.

19. A method according to claim 1, comprising cranking the combustion engine by means of the electric machine arrangement during, the reduction of the output rotational torque of the electric machine arrangement to the gearbox.

20. A method according to claim 1, comprising cranking the combustion engine by means of the electric machine arrangement when the electric machine arrangement is in an operational state that differs substantially from an operational state in which the electric machine is operated at maximum output rotational torque.

21. A method according to claim 1, comprising shifting gears in the gearbox during the switching from, powering the load by means of the electric machine arrangement to powering the load by means of the combustion engine.

* * * * *